United States Patent Office 2,817,118
Patented Dec. 24, 1957

2,817,118

PEARLESCENT POLYSTYRENE

James William Lynn Fordham, Hazardville, Conn., assignor to Monsanto Chemical Company, St. Louis, Mo., a corporation of Delaware No Drawing. Application July 14, 1954,
Serial No. 443,422

2 Claims. (Cl. 18—55)

This invention relates to articles having a pearlescent surface. More particularly, this invention relates to a process for preparing articles having a pearlescent surface.

An object of the present invention is the provision of modified polystyrene articles having a pearlescent surface.

Another object is the provision of a process for preparing modified polystyrene molding compositions and for forming such compositions into articles having a pearlescent surface.

These and other objects are attained by dissolving about 1–20 parts of a solid copolymer of about 95–99% isobutylene with, correspondingly, about 5–1% isoprene in 100 parts by weight of monomeric styrene, polymerizing the styrene and then injection molding the resultant composition.

The following examples are given in illustration and are not intended as limitations on the scope of this invention. Where parts are mentioned, they are parts by weight.

*Example I*

Dissolve 5 parts of a copolymer of 98% isobutylene and 2% isoprene, 1 part of stearic acid and 0.02 part of ditertiary butyl peroxide in 100 parts of monomeric styrene. Heat the resultant solution at a temperature of about 95° C. for about 20 hours and then at about 120° C. for about 24 hours. As a result, there is obtained a composition comprising polystyrene and the isobutylene-isoprene copolymer. Comminute the product and injection mold the same at a temperature of about 200° C. and a ram pressure of about 700 p. s. i. The resultant article has a pleasing pearlescent surface characterized by high surface gloss.

When an article is formed from the above composition by a compression molding process, a pearlescent surface is not obtained. Similarly, a pearlescent surface is not obtained when the composition is milled on mill rolls to form a sheet. Extrusion does not give satisfactory results.

Unsatisfactory results are also obtained by injection molding a composition prepared by incorporating a solid isobutylene-isoprene copolymer into styrene that has already been polymerized.

The copolymers to be dissolved in monomeric styrene in accordance with the present invention are the copolymers of about 95–99% isobutylene with, correspondingly, about 1–5% isoprene. Mixtures of two or more such copolymers may be used, if desired. From about 1–20 parts of copolymer should be used for each 100 parts of monomeric styrene.

The solution formed by dissolving the isobutylene-isoprene copolymer in monomeric styrene should be heated in the presence of a catalytic amount of a suitable polymerization catalyst which is soluble in the monomeric styrene in order to polymerize the styrene. Normally, about 0.01–0.1 part of catalyst should be used for each 100 parts of monomeric styrene. Illustrative of the polymerization catalysts that may be used alone or in admixture are benzoyl peroxide, lauroyl peroxide, di-tertiary butyl peroxide, di-tertiary butyl perphthalate, tertiary butyl percaprylate, tertiary butyl perbenzoate, etc.

The temperature to be used in polymerizing the styrene may be varied within comparatively wide limits. Thus, a reasonable polymerization rate may be obtained by using temperatures of about 50–200° C. Temperatures of about 75–150° C. are preferred. The styrene in which the isobutylene-isoprene copolymer has been dissolved may be polymerized in mass, as in Example I or, if desired, by other conventional polymerization processes. Thus, for example, there may be used a suspension polymerization process wherein 100–200 parts of water are used for each 100 parts of styrene solution. In this situation the styrene solution should be added to the water with agitation in the presence of a small amount of a suitable suspending agent such as tricalcium phosphate, calcium carbonate, aluminum hydroxide, etc.

The compositions that are thus prepared by polymerizing styrene having an isobutylene-isoprene copolymer dissolved therein are, if necessary, reduced to a particulate condition and then injection molded at a temperature of about 150–350° C. and a ram pressure of about 500–1,000 p. s. i. The articles prepared by this process have a pleasing glossy pearlescent surface. A pearlescent surface of high gloss is not obtained if the compositions are formed into articles by other molding processes such as milling, compression molding, extrusion, etc.

If desired, other conventional additives such as plasticizers, stabilizers, destaticizing agents, pigments, dyes, fillers, etc. may be blended with the compositions of the present invention.

What is claimed is:

1. The process which comprises injection molding a styrene polymer composition at a temperature of 150–350° C. and a ram pressure of about 500–1000 p. s. i., said styrene polymer composition having been prepared by dissolving 1–20 parts of a solid copolymer of about 95–99% isobutylene and, correspondingly, about 5–1% isoprene in about 100 parts by weight of monomeric styrene, said isobutylene-isoprene copolymer and monomeric styrene being the only components of the mixture containing aliphatic unsaturation, and then polymerizing the styrene.

2. A molded article prepared by the method of claim 1.

References Cited in the file of this patent

UNITED STATES PATENTS

| | | |
|---|---|---|
| 2,213,423 | Wiezewich | Sept. 3, 1940 |
| 2,609,353 | Rubens et al. | Sept. 2, 1952 |
| 2,610,962 | Smyers et al. | Sept. 16, 1952 |

OTHER REFERENCES

McMillan Abstract of Application Serial No. 715,138, 644 O. G. 305 Mar. 6, 1951.